INVENTOR.
STEPHEN E. TOWNSEND
BY
Stanley Z. Cole
ATTORNEY

INVENTOR.
STEPHEN E. TOWNSEND
BY
Stanley Z. Cole
ATTORNEY

Nov. 26, 1968 S. E. TOWNSEND 3,413,412

PULSE WIDTH DISCRIMINATOR CIRCUIT FOR ELIMINATING NOISE PULSES BELOW A PREDETERMINED MINIMUM WIDTH

Filed Dec. 30, 1964 3 Sheets-Sheet 3

INVENTOR.
STEPHEN E. TOWNSEND

BY

Stanley Z. Cole
ATTORNEY

United States Patent Office 3,413,412
Patented Nov. 26, 1968

3,413,412
PULSE WIDTH DISCRIMINATOR CIRCUIT FOR ELIMINATING NOISE PULSES BELOW A PREDETERMINED MINIMUM WIDTH

Stephen E. Townsend, Rochester, N.Y., assignor to Xerox Corporation, Rochester, N.Y., a corporation of New York Filed Dec. 30, 1964, Ser. No. 422,271
7 Claims. (Cl. 178—7.1)

ABSTRACT OF THE DISCLOSURE

Apparatus in a facsimile system operable to define the noise and intelligence levels of a facsimile video signal. The apparatus includes a transistorized pulse width discriminator circuit wherein a predetermined minimum pulse width corresponding to the pulse width of the white and black signals in the video signal is set so that unwanted noise pulses below the minimum width are eliminated from the video signal.

This invention relates generally to a system for discriminating against noise in a facsimile video signal, and specifically to a circuit in a facsimile system operable to define the noise and intelligence levels of a facsimile video signal.

In facsimile systems, or in any system employing a video intelligence signal, conditions prevail which can cause the introduction of noise into the video signal. Generally, this noise will appear as very short pulses or spikes in either the black or white level region. For obvious reasons, it is advantageous to remove this noise before it reaches the transmitter. The invention relates to a circuit which may be incorporated between the video amplifier and trigger circuits in a facsimile communication system, for minimizing noise in the video signal prior to transmission. More specifically, there is utilized a pulse width discriminator circuit wherein the pulse width of the white and black level of the video intelligence signal can be set for a predetermined minimum width.

In principle it has been discovered that if a negative-edge delay circuit and a positive-edge delay circuit are used in conjunction with associated threshold and differentiation circuits, the pulse width of the white level signal and the pulse width of the black level signal can be held at some minimum value. Further, the delay for each of the circuits can be set by means of a potentiometer to provide a delay of approximately 2 to 10 microseconds. It has been further found that this 2 to 10 microsecond delay in the negative or positive-edge delay circuits is sufficient to eliminate the unwanted noise pulses which are under a minimum width.

Accordingly, it is the primary object of this invention to provide a system for discriminating against noise in a facsimile video signal.

It is another object of this invention to provide a circuit operable to define the noise and intelligence levels of a facsimile video signal.

Still another object of this invention is to provide a circuit which is entirely transistorized, low in cost, simple to construct, reliable in operation and can be constructed on a card module.

Figure 1:
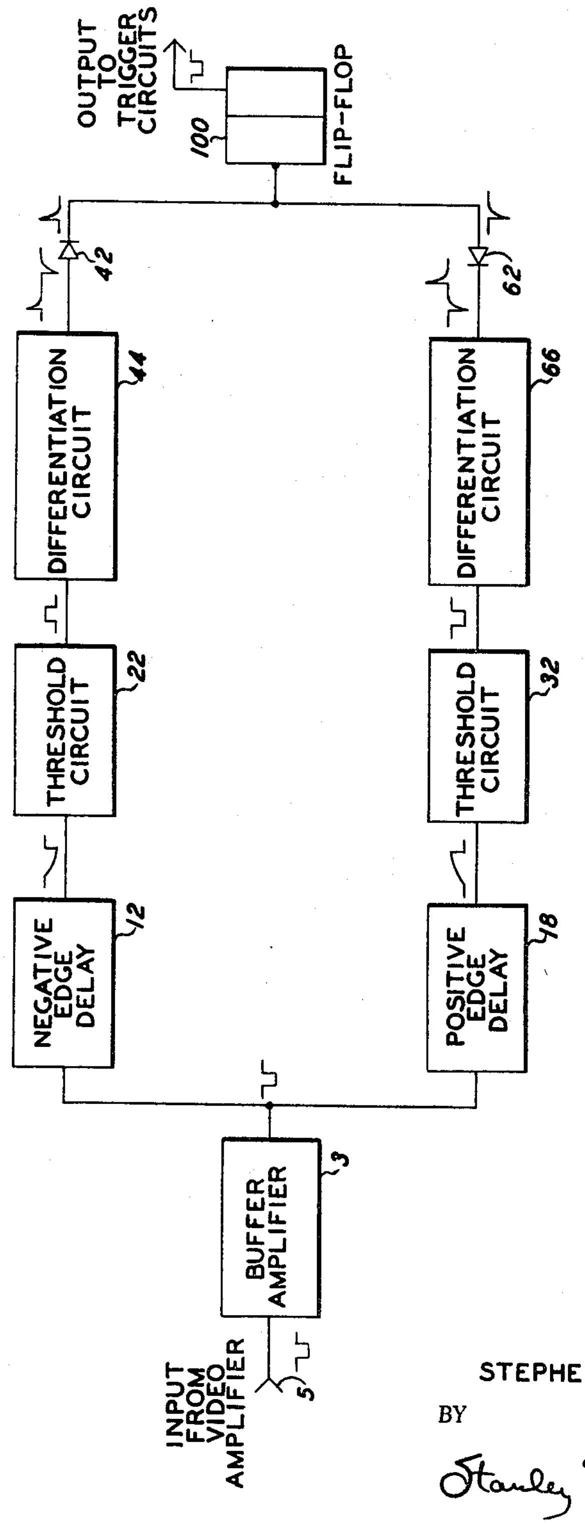
FIG. 1 is a block diagram of the pulse width discriminator circuit.
Figure 2:
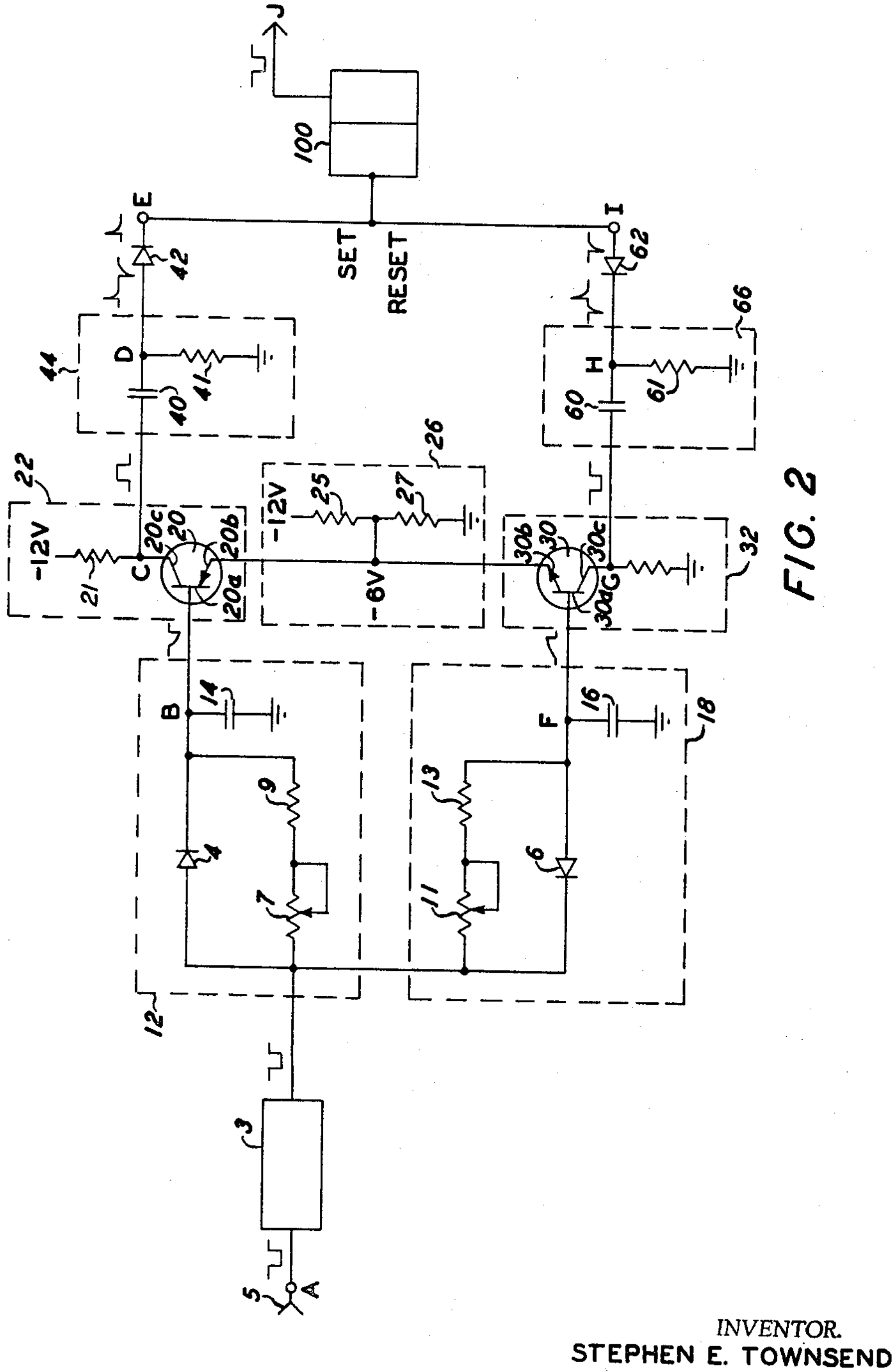
FIG. 2 is a schematic diagram of the pulse width discriminator circuit.

Referring now, generally to FIGS. 1 and 2, the system contains the following circuits: video signal input 5 for receiving the video signal, buffer amplifier 3 feeding the video signal simultaneously to negative-edge delay circuit 12 and positive-edge delay circuit 18, negative-edge delay circuit 12, feeding threshold gating circuit 22, threshold gating circuit 22 in turn feeding differentiation circuit 44, the output of differentiation circuit 44 passing through diode 42 to the input of bistable multivibrator (hereinafter referred to as a flip-flop) 100, positive-edge delay circuit 18 feeding threshold gating circuit 32, threshold gating circuit 32 in turn feeding differentiation circuit 66, the output of differentiation circuit 66 passing through diode 62 to flip-flop 100.

Referring now specifically to FIG. 2, in the facsimile system the input to the buffer amplifier 3 is either a zero voltage level signal or a negative voltage level signal, such as from a video amplifier. Buffer amplifier 3 is a conventional emitter-follower transistor configuration. Negative-edge delay circuit 12 consists of diode 4, resistors 7 and 9 and capacitor 14. The parallel combination of diode 4, with resistors 7 and 9, forms a time constant circuit for the charging of capacitor 14. When diode 4 is forward biased capacitor 14 discharges very quickly. (Forward biasing as referred to herein is a component that offers little impedance to the flow of current; in contradistinction to reverse biasing of a component that offers high impedance to the flow of current.) When diode 4 is reverse biased, capacitor 14 charges slowly through the series combination of resistors 14 charges slowly through the series combination of resistors 7 and 9.

Positive-edge delay circuit 18 consists of diode 6, resistors 11 and 13 and capacitor 16. The parallel combination of diode 6, with resistors 11 and 13, forms a time constant circuit for the discharging of capacitor 16. When diode 6 is forward biased, capacitor 16 charges very rapidly. When diode 6 is reverse biased, capacitor 16 discharges slowly through the series combination of resistors 11 and 13.

Threshold gating circuit 22 consists of PNP common-emitter transistor 20 and resistor 21. The emitter **20*b* of transistor 20 is held in a typical arrangement at —6 volts by the voltage divider network 26. Resistor 21** is furnished —12 volts volts from a conventional power supply not shown.

Transistor 20 is biased into conduction when a voltage more negative than —6 volts is applied to the base **20*a*. With transistor gate 20 biased into conduction, 6 volts is dropped across resistor 21 and —6 volts is applied to the collector 20*c* of transistor 20. Transistor 20 is biased out of conduction with anything more positive than —6 volts on the base 20*a*. With transistor 20 biased out of conduction, no voltage is dropped across resistor 21 and —12 volts is applied to the colletcor 20*c***.

Threshold gating circuit 32 consists of NPN common-emitter transistor 30 and resistor 31. The emitter 30*b* of transistor 30 is held at —6 volts by the voltage divider network 26. Transistor 30 is biased into conduction when a voltage more positive than —6 volts is applied to the base 30*a*. With transistor 30 biased into conduction, 6 volts is dropped across resistor 31 and approximately —6 volts is applied to the collector 30*c*. Transistor 30 is biased out of conduction with any voltage more negative than —6 volts on its base 30*a*. When transistor 30 is biased out of conduction, no voltage is dropped across resistor 31 and 0 volts is applied to the collector 30*c*.

Voltage divider network 26 consists of series resistors 25 and 27. The input to the network is —12 volts applied to one end of the series resistors 25 and 26, while the other end is connected to ground. The network furnishes —6 volts at the common junction of the series for the emitters 20*b* and 30*b* of transistors 20 and 30.

Differentiation circuit 44 consists of capacitor 40 and resistor 41. When the incoming signal to circuit 44 as hereinafter explained, changes from —12 to —6 volts, the differentiation circuit 44 produces a sharp positive pulse output signal. When the incoming voltage changes from —6 to —12 volts, the differentiation circuit 44 produces a sharp negative pulse output signal.

Differentiation circuit 66 consists of capacitor 60 and resistor 61. An incoming signal change to circuit 66 of from 0 to —6 volts produces a sharp negative pulse signal in the output of the differentiation circuit 66. An incoming signal changing from —6 to 0 volts produces a sharp positive pulse signal in the output of the differentiation circuit 66.

Diode 42 functions to block negative pulse signals when it becomes reverse biased; whereas diode 62 functions to block positive pulse signals when it becomes reverse biased.

The bistable multivibrator circuit 100 is the type of circuit that changes state of conduction on receiving positive or negative pulses.

Figure 3:
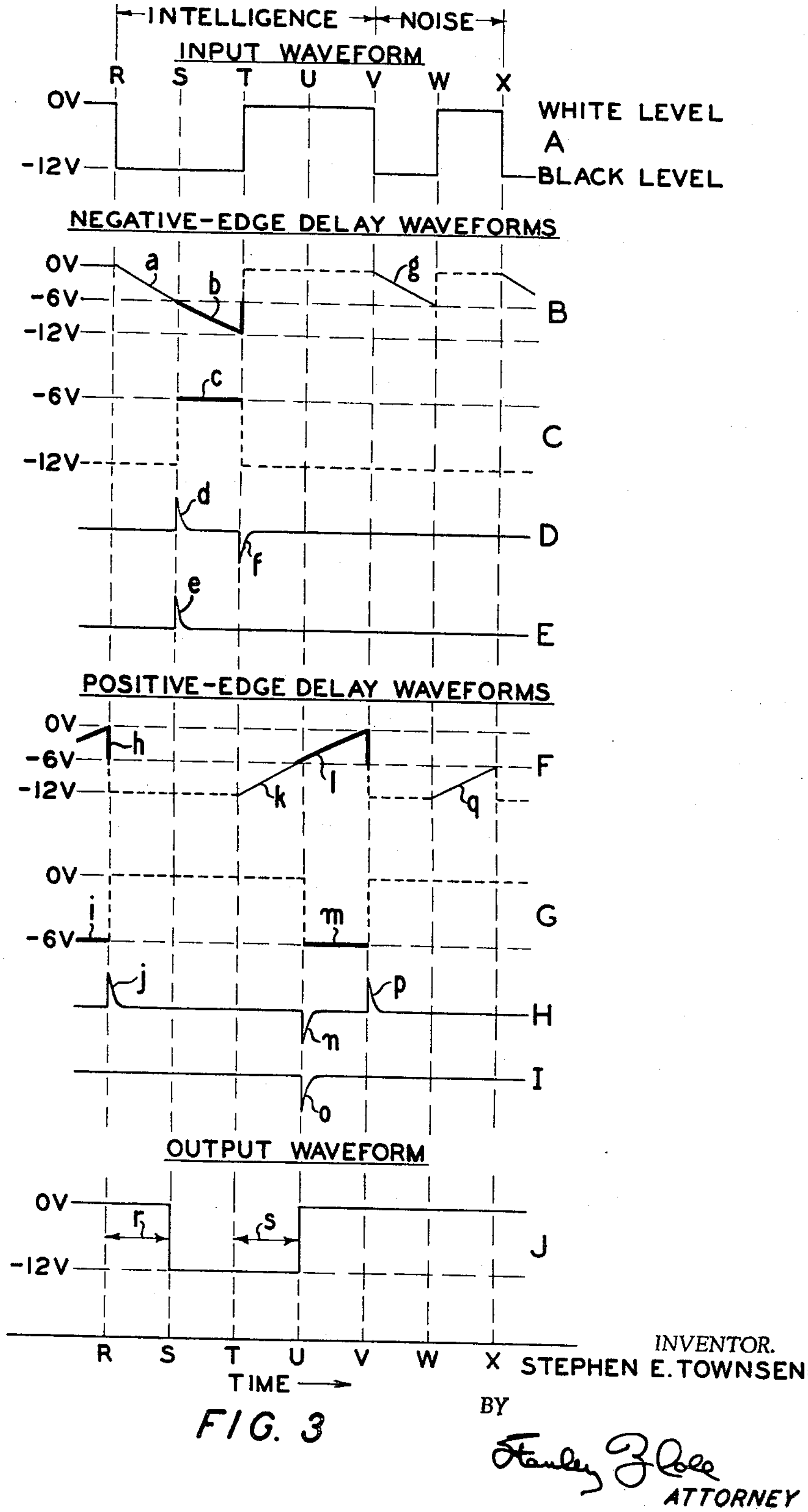
FIG. 3 illustrates the waveforms which appear between the input point A and the output point J in the circuit shown in FIG. 2.

In the description of the circuit operation, continued reference is made to the schematic diagram in FIG. 2 together with the waveform diagram in FIG. 3. The waveforms in FIG. 3 labeled A, B, C, D, E, etc., are the waveforms seen at points A, B, C, D, E, etc., in FIG. 2. In general, the waveforms illustrated in FIG. 3 and explained in detail in the circuit description, are interpreted as follows:

Waveform A represents the input video intelligence signal to the pulse width discriminator circuit, from a video amplifier. The signal varies between the 0 volt and the —12 volt level and contains intelligence as well as noise.

Waveform B represents the discharging and the charging voltage of capacitor 14.

Waveform C represents the voltage on the collector 20*c* of transistor 20.

Waveform D illustrates the positive going and negative going pulses which appear at point D in FIG. 2.

Waveform E illustrates the positive going pulse appearing at point E in FIG. 2.

Waveform F represents the discharging and charging voltage of capacitor 16.

Waveform G represents the voltage on the collector 30*c* of transistor 30.

Waveform H illustrates the positive and negative going pulses appearing at point H in FIG. 2.

Waveform I illustrates the negative going pulse appearing at point I in FIG. 2.

Waveform J represents the output of the pulse width discriminator circuit and is essentially the same as the waveform shown in A, except that the intelligence portion of the video input signal is shifted in time and the black level and white level noise pulses are eliminated.

Each of the vertical reference lines in FIG. 3 labeled R, S, T, U, etc., refer to a single specific time. For example, every point along vertical reference line R, where waveforms A through J cross the line, represents the same specific time. With an oscilloscope connected to every point A through J, the waveforms A through J appear, simultaneously, during time R on the oscilloscope. Time S, to the right of time R in FIG. 3, represents another, later, specific time. Time T occurs later than time S. The video intelligence input signal is considered for purposes of illustration only to be either a 0 (white) or —12 (black) volt level. White level indicates that the facsimile system is scanning white information. Black level indicates that the facsimile system is scanning black information. For purposes of clarity, the negative-edge delay circuit 12 is described first, followed by a description of the positive-edge delay circuit 18. Changes in input video signal levels from 0 volts to —12 volts and from —12 volts to 0 volts are discussed in sequence, from reference line R to reference line X (see FIG. 3). Each input video signal level change is traced from input point A to output point J (see FIG. 2).

*Negative-edge delay*

When the input video signal level at point A in FIG. 2 changes from 0 to —12 volts, i.e., white to black (reference line R in FIG. 3A), diode 4 in negative-edge delay circuit 12 becomes reverse biased. Capacitor 14 charges through the series network consisting of resistor 7 and resistor 9. Line segment *a* and line segment *b*, between reference lines R and T in FIG. 3B indicate the slow charge time of capacitor 14, from the 0 volt level to the —12 volt level. Resistor 7 has a variable tap so that the charging time of capacitor 14 can be varied from 2 to 10 microseconds. Referring to FIG. 3B, reference line S, when capacitor 14 charges to the —6 volt level, transistor 20, in threshold gating circuit 22 is biased into conduction. In FIG. 3B, the point where capacitor 14 charges to the —6 volt level is illustrated by the transition from line segment *a* to line segment *b*, at reference line S. At this transition point the voltage on the collector 20C of transistor 20 rises to approximately —6 volts as shown by line segment *c* in FIG. 3C. Line segment *b* in FIG. 3B and line segment *c* in FIG. 3C, between reference lines S and T indicate that transistor 20 is biased into conduction at this time. When transistor 20 is biased into conduction, a voltage drop occurs across resistor 21. The voltage at point C on the collector 20*c* of transistor 20 rises from —12 volts to —6 volts. Reference is made to FIG. 3C, reference line S. A positive going pulse is produced by the differentiation circuit 44 and appears at point D in FIG. 2. This is the positive going pulse in FIG. 3D labeled *d* at reference line S. The positive going pulse forward biases diode 42 and appears at point E in FIG. 2. FIG. 3E shows this positive going pulse labeled as *e* along reference line S. The positive going pulse *e* in FIG. 3E also appears at one of the inputs to the flip-flop 100. The positive pulse triggers the flip-flop 100 from the 0 volt to the —12 volt output conduction state as shown at reference line S in FIG. 3J.

When the input video signal level at point A in FIG. 2 changes from —12 to 0 volts, i.e., black to white (reference line T in FIG. 3A), diode 4 in negative-edge delay circuit 12 becomes forward biased and capacitor 14 discharges very quickly. The nearly vertical waveform in FIG. 3B, at reference line T, from the —12 volt level to the 0 volt level indicates the short discharging time of capacitor 14. When the charge on capacitor 14 reaches the —6 volt level, transistor 20 in threshold gating circuit 22 becomes biased out of conduction. The dashed, horizontal line in FIG. 3C at the —12 volt level, represents —12 volts on the collector 20*c* of transistor 20 when it is biased out of conduction. When transistor 20 is biased out of conduction, the voltage on the collector 20*c* of transistor 20 at point C, drops from —6 volts to —12 volts. Reference is made to FIG. 3C, reference line T. At this time a negative going pulse is produced at point D in FIG. 2 by the differentiation circuit 44. The pulse is shown in FIG. 3D by the negative going pulse labeled *f* at reference line T. Diode 42 is reverse biased by the negative going pulse *f* and the pulse does not pass. Therefore, the pulse does not appear at point E in FIG. 2, reference line T in FIG. 3E.

The negative-edge delay is the period of time it takes capacitor 14 to charge to the −6 volt level. In FIG. 3B the negative delay is represented by line segment *a*, from reference line R to reference line S.

In FIG. 3A, a pulse of black level noise is indicated between reference lines V and W. The black level noise pulse appears at reference line V as a change from the 0 volt level to the −12 volt level. A pulse of white level noise is indicated between reference lines W and X. The elimination of the pulse of white level noise is discussed under the positive-edge delay circuit. In FIG. 3B, the pulse of black level noise is indicated by line segment *g*. This noise pulse is not long enough to allow capacitor 14 to charge past the −6 volt level. Referring to FIG. 3B, it is seen that line segment *g*, between reference lines V and W, does not extend below the −6 volt level. Therefore, transistor 20 is not biased into conduction and a positive going pulse does not appear at the output of the differentiation circuit 44 at point D in FIG. 2. Referring to FIGS. 3D and 3E, a pulse does not appear along reference line W. By looking at FIG. 3J reference line W, it is seen that the flip-flop 100 is not triggered and does not change from the 0 volt level to the −12 volt level. The end result is that the pulse of black level noise appearing at input A is eliminated by the negative-edge delay circuit and does not appear in the output waveform.

*Positive-edge delay*

When the input video signal level at point A in FIG. 2 changes from 0 to −12 volts, i.e., white to black (reference line R in FIG. 3A) diode 6 in positive-edge delay circuit 18 becomes forward biased. Capacitor 16 charges rapidly as seen in FIG. 3F at reference line R, where the waveform is a nearly vertical line from the 0 volt to the −12 volt level. When capacitor 16 charges to the −6 volt level, indicated in FIG. 3F at reference line R, transistor 30 in threshold gating circuit 32 is biased out of conduction. Line segment *h* in FIG. 3F and line segment *i* in FIG. 3G show transistor 30 biased into conduction just prior to being biased out of conduction along reference line R. In FIG. 3G, the dashed horizontal line at the 0 volt level indicates that transistor 30 is biased out of conduction. With transistor 30 biased out of conduction, there is no voltage drop across resistor 31, and there is a sudden voltage rise from −6 to 0 volts as shown in FIG. 3G at reference line R. Differentiation circuit 66 produces a positive going pulse labeled *j* as shown in FIG. 3H, reference line R. The positive going pulse *j* reverse biases diode 62, i.e., diode 62 is blocked and the pulse does not trigger flip-flop 100. Referring to FIG. 3I, reference line R, it is seen that the positive going pulse *j* does not appear. In FIG. 3J, at reference line R, there is no change from the 0 volt level to the −12 volt level.

When the input video signal level at point A in FIG. 2 changes from −12 volts to 0 volts (reference line T in FIG. 3A), diode 6 in the positive-edge delay circuit 18 becomes reverse biased. Capacitor 16 discharges through the series network consisting of resistors 11 and 13. In FIG. 3F, line segments *k* and *l* between reference lines T and V indicate the slow discharging of capacitor 16 from the −12 volt level to the 0 volt level. Resistor 11 has a variable tap so that the discharging time of capacitor 16 can be varied from 2 to 10 microseconds. When capacitor 16 discharges to the −6 volt level indicated in FIG. 3F at reference line U, transistor 30, in threshold gating circuit 32 is biased into conduction. At this time the voltage on the collector 30*c* of transistor 30 drops to −6 volts. Line segment 1 in FIG. 3F and line segment *m* in FIG. 3G, between reference lines U and V indicate that transistor 30 is biased into conduction. When transistor 30 is biased into conduction, indicated at reference line U in FIG. 3F, there is a voltage drop across resistor 31. The voltage on the collector 30*c* of transistor 30 drops from 0 to −6 volts as illustrated in FIG. 3G at reference line U. At this time the differentiation circuit 66 produces a negative going pulse appearing at point H in FIG. 2. The negative going pulse is shown in FIG. 3H at reference line U and is labeled *n*. The negative going pulse *n* forward biases diode 62 and appears at point I in FIG. 2. The negative going pulse is labeled *o* in FIG. 3I at reference line U. The negative going pulse *o* triggers the flip-flop 100 from the −12 volt output conduction state to the 0 volt output conduction state. Referring to FIG. 3J, reference line U, it is seen that the output signal has changed from −12 volts to 0 volts.

In FIG. 3F another cycle of charging for capacitor 16 begins at reference line V, when the incoming video signal at point A in FIG. 2 changes from the 0 volt level to the −12 volt level. The charging of capacitor 16 has been previously explained in regard to reference line R. It is sufficient to say that the resulting pulse labeled *p* in FIG. 3H at reference line V, is simply a repeat of the pulse labeled *j* in FIG. 3H, previously explained.

As shown in FIG. 3F line segment *k*, the positive delay is the time that it takes capacitor 16 to discharge from the −12 volt level to the −6 volt level.

In FIG. 3A, a pulse of white level noise is illustrated between reference lines W and X. When the white level pulse of noise appears at reference line W as a change from the −12 volt level to the 0 volt level, capacitor 16 begins to discharge. The slow discharging of capacitor 16 is indicated in FIG. 3F by line segment *q* between reference lines W and X. As soon as the charge on capacitor 16 reaches the −6 volt level, indicated in FIG. 3F at reference line X, the pulse of white level noise in FIG. 3A, reference line X, disappears. Capacitor 16 begins to charge at this time and transistor 30 is never biased into conduction. Referring to FIGS. 3H and 3I at reference line X, notice that a pulse is not produced by differentiation circuit 66. If the time for capacitor 16 to discharge from −12 to −6 volts is set in the positive-edge delay circuit to be longer than the time of the white level noise pulse, the noise pulse does not bias transistor 30 into conduction. Flip-flop 100 is not triggered, hence, this white level noise does not appear in output J. Referring to FIG. 3J, reference line X it is seen that there is no change in the conduction state of the flip-flop 100.

Referring to FIG. 3J shows that the waveform appearing at output J is shifted in time along with the elimination of the two short noise pulses. The noise pulses indicated in FIG. 3A between reference lines V and X do not appear in FIG. 3J between reference lines V and X. The shift in time is created by the negative and/or positive-edge delay circuits and is illustrated in FIG. 3J by the time periods between reference lines R and S and T and U. The negative-edge time delay is labeled *r* and the positive-edge time delay is labeled *s* in FIG. 3J. The negative-edge delay and the positive-edge delay circuit can be set independently of each other by variable resistor 7 and variable resistor 11. In this way, black level pulse widths and white level pulse widths can be individually set for a minimum value. A pulse under this minimum width does not respectively charge and discharge capacitor 14 and 16 to their threshold values of −6 volts. The condition of the threshold gating circuits 22 and 32 does not change and the unwanted black or white level noise pulse is eliminated. The flip-flop used with this circuit is designed so that if a succession of pulses having the same polarity appear at a particular input, the flip-flop is triggered only by the first of this succession of pulses.

Although certain and specific circuitry has been illustrated and described, it is understood that modifications and departures may be had thereto without departing from the true spirit and scope of the invention.

What is claimed is:

1. A system for discriminating against black and white level noise pulses in a facsimile video signal comprising, a first circuit means to set a minimum width for said black level signal pulses, a second circuit means to set a minimum width for said white level signal pulses, a first threshold gating circuit connected to said means and operable to change its conduction states on receiving signal level changes, a second threshold gating circuit connected to said second means and operable to change its conduction states on receiving signal level changes, a first unilateral conduction means including means connecting the output of said first threshold circuit thereto, a second unilateral conduction means including means connecting the output of said second threshold circuit thereto, a bistable circuit having a first side connected to said first unilateral conduction means and having a second side connected to said second unilateral conduction means, said bistable circuit providing a video signal output whereby said black and said white level noise pulses are eliminated therefrom.

2. A system for discriminating against black and white level noise pulses in a facsimile video signal comprising, first circuit means to set a minimum width for said black level signal pulses, second circuit means to set a minimum width for said white level signal pulses, a first threshold gating circuit connected to said first means and operable to change its conduction state on receiving a signal level change, a second threshold gating circuit connected to said second circuit means and operable to change its conduction state on receiving a signal level change, a first pulse forming circuit to provide a pulse relating to said conduction state changes of said first threshold gating circuit, a second pulse forming circuit to provide a pulse relating to said conduction state changes of said second threshold gating circuit, a first unilateral conduction means connected to the output of said first circuit, a second unilateral conduction means connected to the output of said second circuit, a bistable circuit having a first side connected to said first unilateral conduction means and having a second side connected to said second unilateral conduction means, said bistable circuit providing a video signal output whereby said black and said white level noise pulses are eliminated therefrom.

3. A system for discriminating against black and white level noise pulses in a facsimile video signal comprising, a signal input circuit, a negative-edge delay circuit to set a minimum width for said black level signal pulses, a positive-edge delay circuit to set a minimum width for said white level signal pulses, a first and a second threshold gating circuit, a bias voltage circuit to supply bias voltage to said threshold gating circuits, said first threshold gating circuit changing conduction state on receiving signal level changes from said negative-edge delay circuit, said second threshold gating circuit changing conduction state on receiving signal level changes from said positive-edge delay circuit, a first unilateral conduction means including means connecting to the output of said first threshold circuit thereto, a second unilateral conduction means connected to the output of said second threshold circuit thereto, a bistable circuit having a first side connected to said first unilateral conduction means and having a second side connected to said second unilateral conduction means, said bistable circuit providing a video signal output whereby said black and said white level noise pulses are eliminated therefrom.

4. A system for discriminating against black and white level noise pulses in a facsimile video signal comprising, a signal input circuit, a negative-edge delay circuit to set a mnimum width for said black level signal pulses, a positive-edge delay circuit to set a minimum width for said white level signal pulses, a first threshold gating circuit connected to said negative-edge delay circuit and operable to change conduction state on receiving a signal level change, a second threshold gating circuit connected to said positive-edge delay circuit and operable to change conduction state on receiving a signal level change from said circuit, a first pulse forming circuit to provide a pulse relating to said conduction state changes of said first threshold gating circuit, a second pulse forming circuit to provide a pulse relating to said conduction state changes of said second threshold gating circuit, a first unilateral conduction means connected to the output of said first circuit, a second unilateral conduction means connected to the output of said second circuit, a bistable circuit having a first side connected to said first unilateral conduction means and having a second side connected to said second unilateral conduction means, said bistable circuit providing a video signal output whereby said black and said white level noise pulses are eliminated therefrom.

5. A system for discriminating against black and white level noise pulses in a facsimile video signal comprising, a signal input circuit, a negative-edge delay circuit to set a minimum width for said black level signal pulses, a positive-edge delay circuit to set a minimum width for said white level signal pulses, a first and a second threshold gating circuit, a bias voltage circuit to supply bias voltage to said threshold gating circuits, said first threshold gating circuit changing conduction state on receiving signal level changes from said negative-edge delay circuit, said second threshold gating circuit changing conduction state on receiving signal level changes from said positive-edge delay circuit, a first circuit to provide a sharp pulse relating to said conduction state changes of said first threshold gating circuit, a second circuit to provide a sharp pulse relating to said conduction state changes of said second threshold gating circuit, a first unilateral conduction means connected to the output of said first circuit, a second unilateral conduction means connected to the output of said second circuit, a bistable circuit having a first side connected to said first unilateral conduction means and having a second side connected to said second unilateral conduction means, said bistable circuit providing a video signal output whereby said black and said white level noise pulses are eliminated therefrom.

6. A system for discriminating against black and white level noise pulses in a facsimile video signal comprising, a signal input circuit, a first circuit means to set a minimum width for said black level signal pulses, a second circuit means to set a minimum width for said white level signal pulses, a first and a second gating circuit, said first threshold gating circuit changing conduction state on receiving signal level changes from said first pulse width circuit means, said second threshold gating circuit changing conduction state on receiving signal level changes from said second pulse width circuit means, a first pulse forming circuit to provide a sharp pulse relating to said conduction state changes of said first threshold gating circuit, a second pulse forming circuit to provide a sharp pulse relating to said conduction state changes of said second threshold gating circuit, a first unilateral conduction means connected to the output of said first circuit, a second unilateral conduction means connected to the output of said second circuit, a bistable circuit having a first side connected to said first unilateral conduction means and having a second side connected to said second unilateral conduction means, said bistable circuit providing a video signal output whereby said black and said white level noise pulses are eliminated therefrom.

7. A system for discriminating against black and white level noise pulses in a facsimile video signal comprising, a buffer amplifier to provide a specific signal level input, a negative-edge delay circuit to set a minimum width for said black level signal pulses, a positive-edge delay circuit to set a minimum width for said white level signal pulses, a first and second threshold gating circuit, a bias voltage circuit to supply bias voltage to said threshold gating circuits, said first threshold gating circuit changing conduction state on receiving signal level changes from said negative-edge delay circuit, said second threshold gating circuit changing conduction state on receiving signal level changes from said positive-edge delay circuit, a first differentiation circuit to provide a sharp pulse relating to said conduction state changes of said first threshold gating circuit, a second differentiation circuit to provide a sharp pulse relating to said conduction state changes of said second threshold gating circuit, a first diode connected to the output of said first differentiation circuit, a second diode connected to the output of said second differentiation circuit, a multivibrator circuit having a first side connected to said first diode and having a second side connected to said second diode, said multivibrator circuit providing a video signal output whereby said black and said white level noise pulses are eliminated therefrom.

References Cited

UNITED STATES PATENTS

| | | | |
|---|---|---|---|
| 2,824,224 | 2/1958 | Fulmer. | |
| 2,912,575 | 11/1959 | Hurley | 328—112 |
| 3,277,311 | 10/1966 | Merlen et al. | 328—111 XR |

ROBERT L. GRIFFIN, *Primary Examiner.*

ROBERT L. RICHARDSON, *Assistant Examiner.*